(12) United States Patent
Wickliffe

(10) Patent No.: US 9,677,658 B2
(45) Date of Patent: *Jun. 13, 2017

(54) BICYCLE CHAIN RINGS

(71) Applicant: Wick Werks, LLC, Ogden, UT (US)

(72) Inventor: Christopher A. Wickliffe, Ogden, UT (US)

(73) Assignee: Wick Werks, LLC, Ogden, UT (US)

( * ) Notice: Subject to any disclaimer, the term of this patent is extended or adjusted under 35 U.S.C. 154(b) by 366 days.

This patent is subject to a terminal disclaimer.

(21) Appl. No.: 14/144,329

(22) Filed: Dec. 30, 2013

(65) Prior Publication Data
US 2014/0113757 A1  Apr. 24, 2014

Related U.S. Application Data

(63) Continuation of application No. 11/397,234, filed on Apr. 3, 2006, now Pat. No. 8,617,015.

(60) Provisional application No. 60/721,414, filed on Sep. 27, 2005.

(51) Int. Cl.
*F16H 55/30* (2006.01)
*B62M 9/10* (2006.01)

(52) U.S. Cl.
CPC ............... *F16H 55/30* (2013.01); *B62M 9/10* (2013.01)

(58) Field of Classification Search
CPC .................................. F16H 44/30; B62M 9/10
USPC ........................................................ 474/160
See application file for complete search history.

(56) References Cited

U.S. PATENT DOCUMENTS

| 4,519,791 A | 5/1985 | Nagano |
| 5,066,264 A | 11/1991 | Romano |
| 5,078,653 A * | 1/1992 | Nagano ..................... B62M 9/10 474/160 |
| 5,192,248 A * | 3/1993 | Nagano .................. B62M 9/105 474/140 |

(Continued)

FOREIGN PATENT DOCUMENTS

| TW | 83202091 | 2/1994 |
| TW | 243835 B | 3/1995 |

(Continued)

OTHER PUBLICATIONS

Real Product Design, Inc., Photographs of Real Chainring 42T 94MM, Silver, Model CHRRD4294, exact date unknown, but product on sale prior to Sep. 26, 2004.

(Continued)

*Primary Examiner* — William E Dondero
*Assistant Examiner* — Mark K Buse
(74) *Attorney, Agent, or Firm* — Taft Stettinius & Hollister, LLP; Ryan O. White

(57) ABSTRACT

Embodiments of the present invention include bicycle chain rings for bicycles having specially shaped ramps, tapers and profiled teeth for improved shifting performance. The embodiments of bicycle chain rings of the present invention may be configured for large chain rings on double cranksets and large and middle chain rings on triple cranksets. The embodiments of bicycle chain rings of the present invention may also be retrofitted to existing bicycle cranksets by replacing original chain rings. The embodiments of bicycle chain rings of the present invention may further be configured for any standard crankset mounting bolt configuration and for any suitable number of teeth.

8 Claims, 16 Drawing Sheets

(56) References Cited

U.S. PATENT DOCUMENTS

| | | | |
|---|---|---|---|
| 5,192,249 A * | 3/1993 | Nagano | B62M 9/10 474/160 |
| 5,413,534 A * | 5/1995 | Nagano | B62M 9/105 474/160 |
| 5,437,582 A | 8/1995 | Romano | |
| 5,458,543 A * | 10/1995 | Kobayashi | B62M 9/10 474/160 |
| 5,609,536 A | 3/1997 | Hsu | |
| 5,738,603 A * | 4/1998 | Schmidt | B62M 9/10 474/158 |
| 5,782,712 A | 7/1998 | Campagnolo | |
| 5,876,296 A * | 3/1999 | Hsu | B62M 9/10 474/140 |
| 5,935,034 A | 8/1999 | Campagnolo | |
| 6,139,456 A * | 10/2000 | Lii | B62M 9/10 474/152 |
| 6,340,338 B1 * | 1/2002 | Kamada | B62M 9/122 474/152 |
| 6,572,500 B2 * | 6/2003 | Tetsuka | B62M 9/10 474/160 |
| 6,666,786 B2 | 12/2003 | Yahata | |
| 6,805,645 B2 * | 10/2004 | Mao | B62M 9/10 474/152 |
| 6,923,741 B2 | 8/2005 | Wei | |
| 8,092,329 B2 * | 1/2012 | Wickliffe | B62M 9/105 474/160 |
| 8,096,908 B2 * | 1/2012 | Oishi | B62M 9/10 474/160 |
| 8,226,511 B2 * | 7/2012 | Kamada | B62M 9/10 474/152 |
| 8,506,436 B2 * | 8/2013 | Wickiffe | B62M 9/105 474/160 |
| 8,517,874 B2 * | 8/2013 | Reiter | F16H 55/30 474/152 |
| 8,617,015 B2 * | 12/2013 | Wickliffe | B62M 9/10 474/140 |
| 2002/0160869 A1 | 10/2002 | Barnett | |
| 2003/0073530 A1 | 4/2003 | Mao et al. | |
| 2004/0259674 A1 * | 12/2004 | Pfister | F16H 55/30 474/152 |
| 2007/0049437 A1 | 3/2007 | Wickliffe | |
| 2012/0202633 A1 * | 8/2012 | Wickliffe | B62M 9/105 474/160 |
| 2014/0113757 A1 * | 4/2014 | Wickliffe | B62M 9/10 474/160 |

FOREIGN PATENT DOCUMENTS

| | | |
|---|---|---|
| TW | 406657 B | 9/2000 |
| TW | 426018 B | 3/2001 |

OTHER PUBLICATIONS

Taiwan Bicycles and Parts Guide, 1994-1995, 2 pages (1995).
Taiwanese Schematic, 1 page (1994).
Photograph of CPI Model CPI-347 SQS chainring, (1995).

* cited by examiner

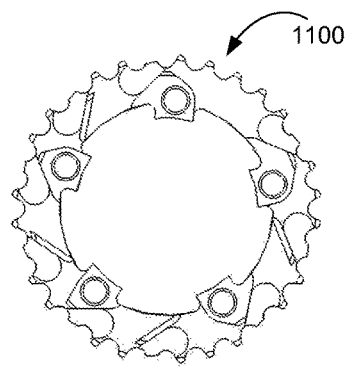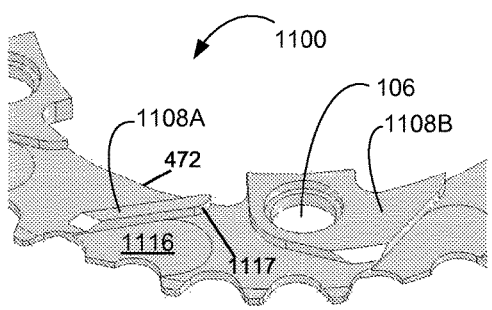
FIG. 11  FIG. 12
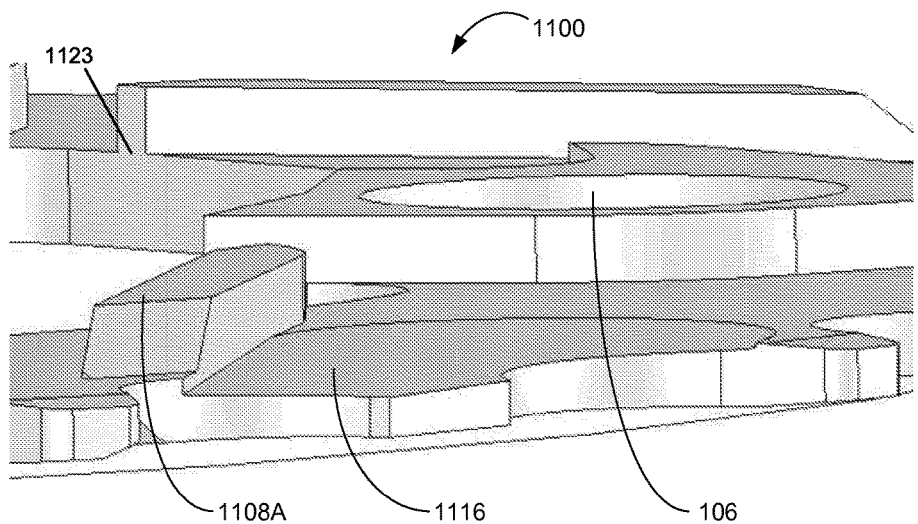
FIG. 13

BICYCLE CHAIN RINGS

REFERENCE TO RELATED APPLICATION

This nonprovisional patent application is a continuation-in-part (CIP) of U.S. patent application Ser. No. 11/397,234 entitled "Bicycle chain rings" that was filed on Apr. 3, 2006 by Christopher A. Wickliffe that issued on Dec. 31, 2013 as U.S. Pat. No. 8,617,015 and claimed benefit and priority under 35 U.S.C. §119(e) of the filing of U.S. Provisional Patent Application Ser. No. 60/721,414, titled "BICYCLE CHAIN RINGS," filed on Sep. 27, 2005, the contents of which are all incorporated herein by reference for all purposes as if fully set forth herein.

BACKGROUND OF THE INVENTION

The present invention relates generally to bicycle cranksets and chain rings. More particularly, this invention relates to bicycle chain rings with selectively placed ramps and chamfering for improved shifting performance.

Conventional bicycle gear systems typically include a crankset including two or three chain rings affixed to a crank arm spider and a separate simple crank arm. The crank arms of a crankset are configured to receive pedals on one end and to be affixed at the other end to a bottom bracket spindle with bearings for rotation. Conventional bicycle gear systems also typically include a rear cog set, occasionally referred to as a cassette or cluster having one or more gears with teeth configured to rotate a rear wheel through a hub with bearing mechanism. Conventional bicycle gear systems further include a bicycle chain which is driven by the chain rings of the crankset which, in turn, drive the cogs of the rear cog set. The gears of the bicycle may be selectively changed using shifters with control wires attached to front and rear derailleurs.

Conventional front derailleurs used with cranksets having two or three chain rings push the chain from one ring to the next using lateral motion. During an up-shift, for example, the chain guide of a front derailleur pushes laterally against the side of a chain until the links of the chain finally catch on a tooth of the larger adjacent chain ring and all subsequent links of the chain follow until the chain is aligned with the teeth of the larger adjacent chain ring. A down-shift is achieved by pushing laterally against the chain resting on the larger chain ring until the chain can fall down to the smaller chain ring.

This conventional method of pushing laterally against the chain with a chain guide provides adequate shifting for most purposes. However, under extreme loading, such as sprinting in the context of racing or out of the saddle climbing, there is a need for quicker shifting, especially up-shifting. A number of solutions have been proposed to improve shifting performance of a front derailleur.

The inventor of the present application has disclosed an improved front derailleur, see e.g., U.S. Pat. Nos. 6,454,671 and 7,025,698, both to Wickliffe, that solves part of the shifting problem by using a chain guide that physically lifts up the bicycle chain during up-shifts and pulls down the bicycle chain during down-shifts, unlike conventional front derailleurs with their predominantly lateral movement of the bicycle chain, during both up- and down-shifts.

Other approaches to improving front derailleur shifting performance have focused on redesigning bicycle chains by shaping outer chain links to more readily grab conventional teeth found on conventional chain rings. By shaping outer chain links of a bicycle chain to bow out laterally or to have chamfered or tapered inner surfaces, such chains may be able to grab chain ring teeth quicker.

Still other approaches to improving front derailleur shifting performance have focused on redesigning the chain rings themselves. For example, U.S. Pat. No. 5,078,653 to Nagano discloses a larger chain ring with selected teeth having reduced height relative to adjacent teeth, i.e., the crests of the selected teeth having been uniformly cut off to reduce height. Additionally, a short pin has been inserted into the inside of the larger chain ring just below the trimmed teeth and opposed to the smaller chain ring. The arrangement disclosed in the '653 patent, facilitates quicker down-shifts by allowing the chain to disengage at the trimmed teeth and be lowered onto the teeth of a smaller chain ring via the short pin. However, there is no indication that the invention disclosed in the '653 patent improves up-shifting, especially during high loads as mentioned above.

U.S. Pat. No. 6,666,786 to Yahata discloses another improvement to down-shifting performance through the use of chamfered chain ring teeth. However, neither the '653 patent nor the '786 patent appear to address, let alone solve, the problem of achieving improved up-shifting.

An approach directed toward improving up-shifting by redesigning a conventional chain ring is disclosed in U.S. Pat. No. 5,413,534 to Nagano. Another approach to improving up-shifting by redesigning the chain rings is disclosed in U.S. Pat. No. 6,572,500 to Tetsuka. The '534 and '500 patents disclose the use of pins or a pin in combination with a tooth and/or tooth chamfering to aid in up-shifting. However, in both patents the pin or teeth engage a given chain link at the point directly between chain link rollers. The load points of a bicycle chain are at each of the chain link rollers (bushings surrounding pins). Thus, the use of pins as disclosed in the '534 and '500 patents to Nagano and Tetsuka, respectively, may increase stress on the chain especially during high loads and, thus, could lead to increased wear and reduce longevity of the chain.

U.S. Pat. No. 5,876,296 to Hsu et al. discloses the use of an axially oriented recess in combination with a support protrusion to aid in up-shifting. U.S. Pat. No. 5,738,603 to Schmidt et al. discloses a chain ring with pins, chamfered teeth and missing teeth to aid in shifting. Neither of these patents appears to address the added stress to the chain from the allegedly improved up-shifting performance of their respective inventions.

Accordingly, there still exists a need in the art for a bicycle chain ring that achieves improved shifting performance without increasing the stress on the bicycle chain, thereby addressing at least some of the shortcomings of the prior art.

SUMMARY OF THE INVENTION

An embodiment of a bicycle chain ring is disclosed. The bicycle chain ring may include a plurality of ramps disposed about an inner surface of the bicycle chain ring, wherein each of the plurality of ramps is configured with a lifting surface to engage a plurality of outer chain links of a bicycle chain during an up-shift. Additional features of other embodiments of a bicycle chain ring include, inside tapers adjacent lifting surfaces of the ramps, inside and outside bevels along tips of teeth to form angled knife edges, outside tapers or notches to selected teeth, partially cutoff teeth and channels between ramps.

An embodiment of a method for up-shifting a bicycle chain from a smaller bicycle chain ring to a larger bicycle chain ring is also disclosed. The method may include providing a larger bicycle chain ring having the features described herein. The method may further include rotating a crankset including the smaller and larger bicycle chain rings in a forward motion direction. The method may further include urging the bicycle chain toward the inner surface of the larger bicycle chain ring. The method may further include multiple outer chain links of the bicycle chain engaging a lifting surface on a ramp and lifting the bicycle chain off of the smaller bicycle chain ring and onto the larger bicycle chain ring.

BRIEF DESCRIPTION OF THE SEVERAL VIEWS OF THE DRAWINGS

The following drawings illustrate exemplary embodiments for carrying out the invention. Like reference numerals refer to like parts in different views or embodiments of the present invention in the drawings.

FIG. 11 is a plan view of the inside of a 32 tooth bicycle chain ring on 94 mm mounting bolt centers having five mounting bolt holes according to an embodiment of the present invention.

FIG. 12 is an enlarged perspective view of a portion of the inside of the bicycle chain ring shown in FIG. 11.

FIG. 13 is a super-enlarged perspective view of a portion of the inside of the bicycle chain ring shown in FIG. 11-12.

DETAILED DESCRIPTION OF THE INVENTION

Figure 1:
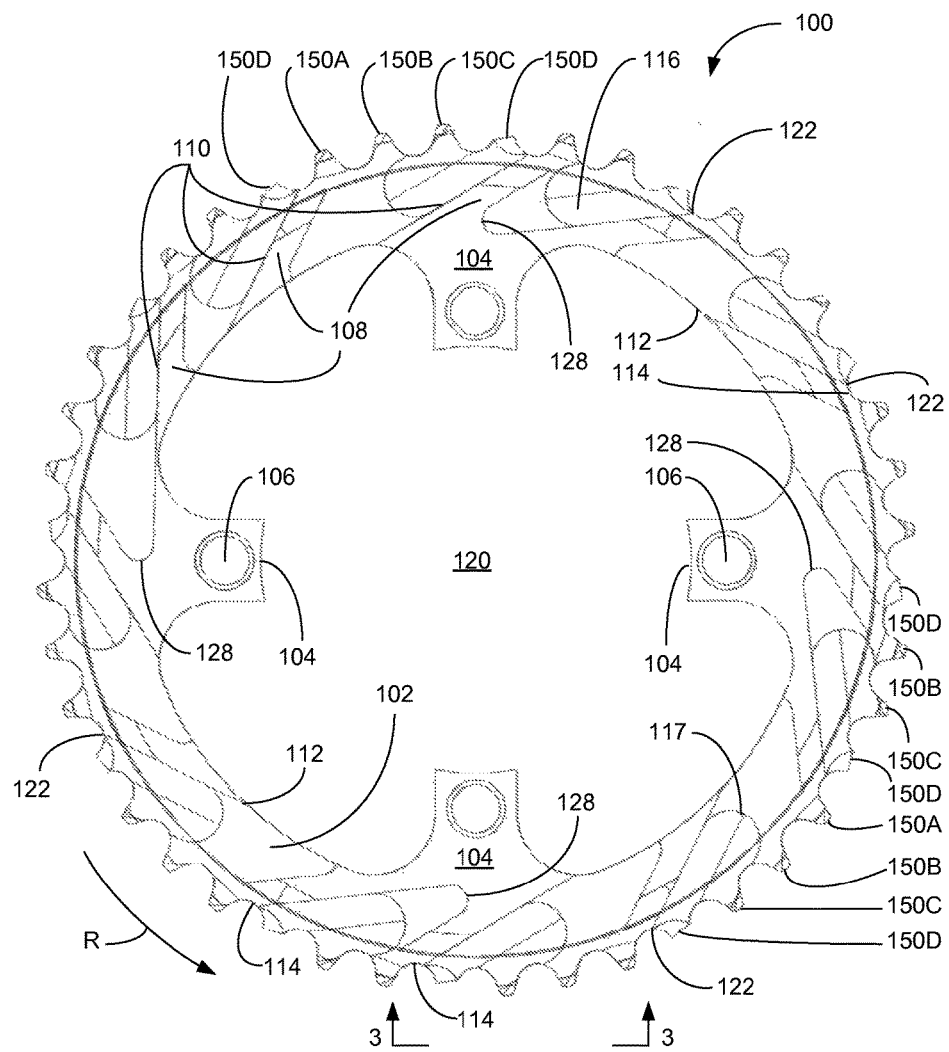
FIG. 1 is a plan view of an inner surface of a bicycle chain ring according to an embodiment of the present invention.

Embodiments of the present invention include chain rings for bicycles having specially shaped ramps, tapers and profiled teeth for improved shifting. The embodiments of the chain rings of the present invention may be retrofitted to existing bicycle cranksets and can be configured for any standard bolt on configuration and number of teeth. For example and not by way of limitation, the embodiments of chain rings of the present invention may include middle chain rings in 32 tooth "compact" or 34 tooth "standard" configurations with either four or five bolt mounting structures. Additionally, the embodiments of chain rings of the present invention may include outer (large or big) chain rings in 44 tooth "compact" or 46 tooth "standard" configurations with either four or five bolt mounting structures. In road bike configurations (dual chain ring or "double crankset"), the embodiments of chain rings of the present invention may include outer (big) chain rings in 53 tooth "standard" configurations with five bolt mounting structures. Of course, any number of teeth or bolt patterns may be used with the chain rings of the present invention and all such variations are considered to be within the scope of the present invention.

An embodiment of a bicycle chain ring is disclosed. The bicycle chain ring may include a plurality of ramps disposed about an inner surface of the bicycle chain ring, wherein each of the plurality of ramps is configured with a lifting surface to engage a plurality of outer chain links of a bicycle chain during an up-shift. Lifting surfaces on each of the ramps may include linear, bilinear, multilinear, or curved profiles according to various embodiments of the bicycle chain ring. The ramps end at a trough or recess between two adjacent teeth according to another embodiment of the present invention. Furthermore one of the two adjacent teeth may be partially cutoff, according to yet another embodiment of the present invention.

Another embodiment of a bicycle chain ring may include an inside taper in the bicycle chain ring. The inside taper may be located adjacent to each of the plurality of ramps. The inside taper may provide decreasing bicycle chain ring thickness in a direction opposite normal rotation (forward motion) of the bicycle chain ring during an up-shift. According to another embodiment, the bicycle chain ring may further include partially cutoff teeth located radially outward from an outer end of each of the plurality of ramps. According to another embodiment, the bicycle chain ring may further include a plurality of non-partially cutoff teeth in between each of the partially cutoff teeth. According to a further embodiment, each non-partially cutoff tooth may have an inside bevel located proximate its tip. According to a still further embodiment, the bicycle chain ring may further include outside bevels located in tips of all teeth except for the partially cutoff teeth.

Another embodiment of a bicycle chain ring may further include an outside taper in each tooth immediately adjacent to and in a clockwise direction from a partially cutoff tooth when viewing an inside surface of the bicycle chain ring, see FIGS. 5 and 8 and related discussion, below. Still another embodiment of a bicycle chain ring may further include angled knife edges in each non-partially cutoff tooth when viewed from an edge of the bicycle chain ring looking down onto tips of the non-partially cutoff teeth, wherein the angled knife edges are not parallel to a plane running through the bicycle chain ring, see FIG. 3 and related discussion below. In yet another embodiment of a bicycle chain ring, a channel may be formed in the inside surface of the bicycle chain ring between adjacent ramps.

Embodiments of bicycle chain rings according to the present invention may have any suitable number of teeth, but more particularly in the range from 30 to 54 teeth. Embodiments of bicycle chain rings according to the present invention may have four or five support structures each having a mounting hole configured for attachment to a crank arm spider.

Embodiments of bicycle chain rings according to the present invention may include ramp structural width ranging from about 2 mm to about 30 mm. Ramp structural width may be measured in parallel to an inside surface of the bicycle chain ring and perpendicular to a lifting surface of the ramp. Embodiments of bicycle chain rings according to the present invention may include ramp structural thickness ranging from about 2 mm to about 5 mm. Ramp structural thickness may be measured perpendicular from the inside surface of the bicycle chain ring to the top surface of a ramp.

FIG. 1 is a plan view of an inner surface of a bicycle chain ring 100 according to an embodiment of the present invention. The bicycle chain ring 100 may include a circular structural member 102 having a plurality of contoured teeth 150A-D replicated serially in a clockwise manner about a circumference of the circular structural member 102. The bicycle chain ring 100 may further include a plurality of ramps 108 that are raised up from, and regularly disposed about, the inner surface of circular structural member 102.

Each of the plurality of ramps 108 may be configured with a lifting surface 110 to engage a plurality of outer chain links of a bicycle chain (not shown) to aid in lifting the bicycle chain from a smaller chain ring (also not shown) that is concentric but displaced away from the inner surface of bicycle chain ring 100. Each lifting surface 110 of each ramp 108 may run generally from a periphery 112 of an inner opening 120 to an outer end 122 near the base of a partially cutoff tooth 150D as shown in the illustrated embodiment of bicycle chain ring 100. However, lifting surfaces 110 need not extend all the way to the periphery 112 of inner opening 120, for example, see ramp starts 128.

According to an embodiment of the present invention, lifting surfaces 110 may be linear in profile as shown in FIG. 1. Alternatively according to another embodiment of bicycle chain ring 400 of the present invention, at least one of the lifting surfaces may be multi-linear in profile (e.g., see 410 in FIG. 4). According to still another embodiment of bicycle chain ring 100 of the present invention, at least one of the lifting surfaces 110 may be arcuate or curved in profile, not shown in FIGS.

According to an embodiment of a bicycle chain ring 100 shown in FIG. 1, each of the plurality of ramps 108 may begin near a support structure 104 or at a periphery of an inner opening 112 of the circular structural member 102. Each of the plurality of ramps 108 ends at a trough or recess 114 between teeth 150A and 150D. The thickness and width of the structure used to form the plurality of ramps 108 may be of any suitable dimension. Furthermore, any suitable material may be used to form the chain rings 100 according to embodiments of the present invention, for example and not by way of limitation, aluminum, titanium, steel and carbon fiber.

According to another embodiment of the present invention, bicycle chain ring 100 may further include an inside taper 116 in the circular structural member 102 located above each of the plurality of ramps 108. The inside taper 116 may be achieved by any suitable means including, but not limited to machining, stamping or investment casting. The inside taper 116 may be linear in nature and reduce the thickness of the circular structural member 102 above each ramp 108 in any amount ranging from 0 mm to approximately 2 mm. The inside taper 116 may begin, for example along the curved lines 117 and extend through teeth 150C and 150D to an outer end 122 where the taper is greatest. The inside taper 116 provides decreasing circular structural member 102 thickness in a direction opposite normal rotation, R, of the bicycle chain ring 100 during an up-shift. See FIG. 3 and related discussion below for further illustration of inside taper 116.

According to still another embodiment of the present invention, bicycle chain ring 100 may further include partially cutoff teeth 150D located radially above an outer end 122 of each of the plurality of ramps 108. Nonpartially cutoff teeth 150A-C may be found between the partially cutoff teeth 150D. Generally speaking, all teeth 150A-D shown in FIG. 1 are contoured or profiled to improve shifting characteristics as described herein.

Figure 2:
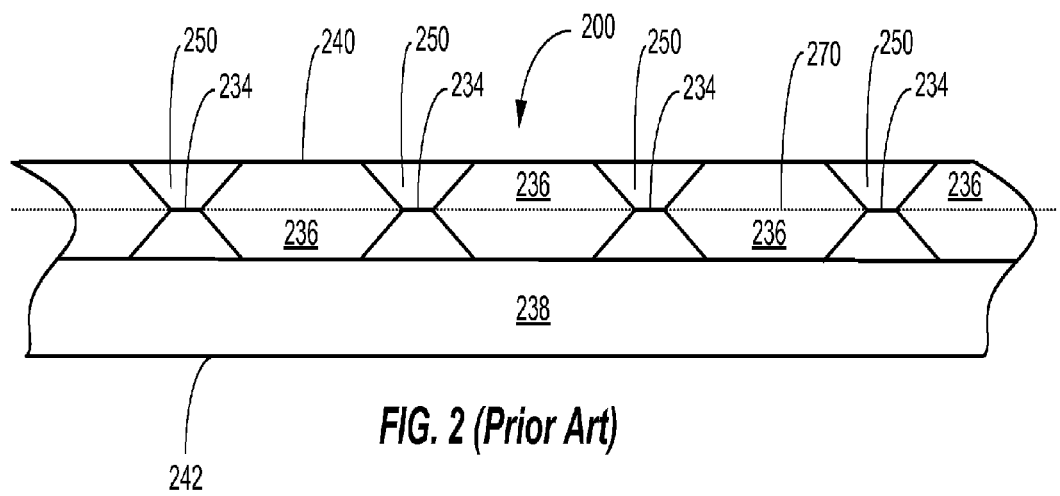
FIG. 2 is an edge view of a portion of a conventional bicycle chain ring viewed from above the teeth.

FIG. 2 is an edge view of a portion of a conventional bicycle chain ring, shown generally at 200, viewed from above the teeth 250. The relative dimensions of FIG. 2 are not drawn to scale, but, are exaggerated for ease of explanation. A conventional bicycle chain ring 200 may have an inside surface 240 and an outside surface 242. A conventional bicycle chain ring 200 may have generally uniform shaped teeth 250 having knife edge points 234 separated by generally uniformly rounded troughs 236 that support round bushings (not shown) of a bicycle chain (not shown). Conventional bicycle chain rings 200 may also have an outer ridge 238 and/or an inner ridge (not shown) for structural support. FIG. 2 also illustrates a center plane 270 (see dotted line) that is coplanar with knife edge points 234.

Figure 3:
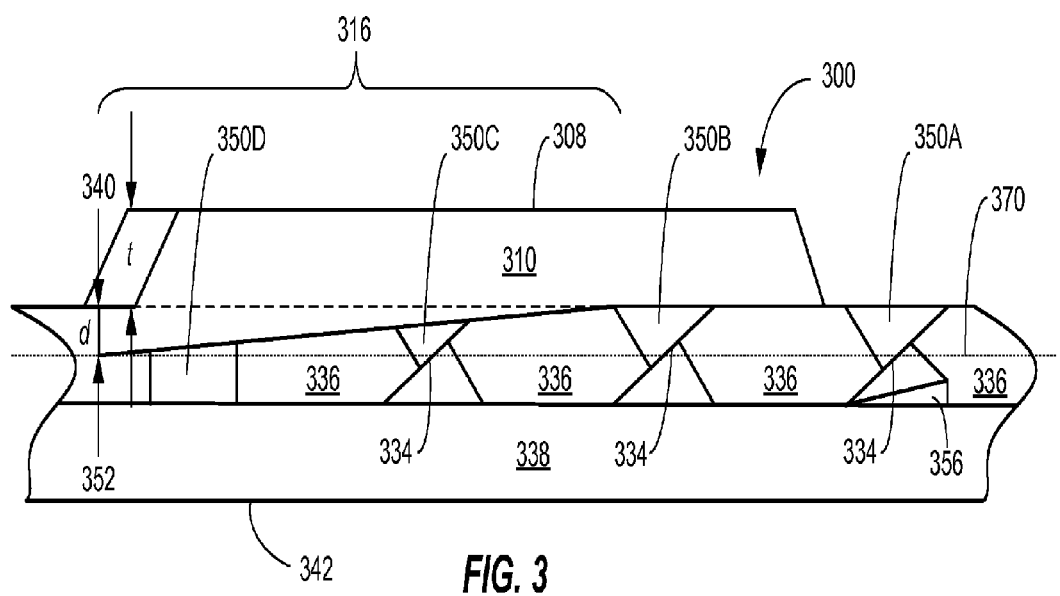
FIG. 3 is an edge view of a portion of an embodiment of a bicycle chain ring according to the present invention.

In contrast, FIG. 3 is an edge view of a portion of an embodiment of a bicycle chain ring 300 according to the present invention (as indicated on FIG. 1 by bent arrows 3). As with FIG. 2, the relative dimensions of FIG. 3 are not drawn to scale, but are exaggerated for ease of explanation. The view of a portion of bicycle chain ring 300 shown in FIG. 3 illustrates a top view of four adjacent contoured teeth 350A-D. Bicycle chain ring 300 may also have an outer ridge 338, according to the embodiment shown in FIG. 3. Bicycle chain ring 300 may further include rounded troughs 336 for supporting cylindrical bushings (not shown) of a bicycle chain (not shown) in between each of the contoured teeth 350A-D. However, the surfaces of rounded troughs 336 are not uniform like the rounded troughs 236 of the conventional bicycle chain ring 200 (FIG. 2) because of the additional novel features of the contoured teeth 350A-D.

The portion of an embodiment of a bicycle chain ring 300 illustrates a ramp 308 having a lifting surface 310 for engaging a bicycle chain (not shown) during up-shifts. The ramp 308 with lifting surface 310 is a unique feature that is completely missing from conventional bicycle chain ring 200. While some conventional bicycle chain rings have pins, they still do not have ramps 308 with extended lifting surfaces for engaging multiple links of a bicycle chain. The pins associated with some conventional bicycle chain rings only engage a single bicycle chain link. However, the inside lifting surfaces 110 and 310 of ramps 108 and 308 of the embodiments of bicycle chain rings 100 and 300 of the present invention are capable of supporting a plurality of bicycle chain links. This feature of embodiments of the present invention provides better support to lift a bicycle chain during up-shifts. This feature is especially important during hard up-shifts, for example when sprinting or when the rider is out of the saddle during climbing, thereby putting substantial tensile force on the chain.

The lifting surface 310 on ramp 308 is expanded (below the dashed line in FIG. 3) along inside taper 316 (shown generally below bracket in FIG. 3). The inside taper 316 is formed in the inside of bicycle chain ring 300. The inside taper 316 narrows the overall thickness of the teeth 350A-D and troughs (saddles) 336 by a distance, d, defined by a distance measured from inside surface 340 (shown in part by dashed line in FIG. 3) to the deepest chamfer cut point 352. That inside taper distance, d, may be any amount up to about 2 mm according to various embodiments of bicycle chain ring 300.

Another feature of bicycle chain ring 300 is the angled knife edges 334 of teeth 350A-C. FIG. 3 illustrates a center plane 370 (see dotted line) that clearly shows that the angled knife edges 334 are noncoplanar, i.e., angled knife edges 334 do not fall along the center line 370, but are angled to it. The angling of the knife edges 334 of teeth 350A-C provides enhanced bicycle chain meshing during an up-shift because the bicycle chain twists during an up-shift from a smaller to larger chain ring. Note that the angling of the knife edges 334 shown in FIG. 3 are exaggerated for ease of explanation and may not actually be angled as greatly as illustrated. The angling of the knife edges 334 tracks the twisting of the bicycle chain to more quickly engage the bicycle chain than without the angled knife edges 334. This feature improves up-shifting performance (faster) relative to knife edges points 234 (see FIG. 2) having no angling. This feature may also improve chain meshing when the bicycle chain is being driven at an angle relative to rear cogs associated with a freewheel or cassette mechanism. Poor chain meshing is characterized by lack of consistent seating of the bicycle chain in troughs 236 and may be caused by the bicycle chain being driven at an angle relative to rear cogs. Poor chain meshing may also be characterized by increased noise resulting from the lack of consistent seating of the bicycle chain and its cylindrical bushings in troughs 236.

Still another feature illustrated in FIG. 3 is outside taper 356 in contoured tooth 350A. Outside taper 356 works in conjunction with ramp to the right of tooth 350A (not shown) to narrow the thickness of contoured tooth 350A and thereby making it easier for tooth 350A to grab the bicycle chain ring 300 during an up-shift. According to another embodiment, outside taper 356 may be a short bevel or chamfer along the outside edge of tooth 350A rather than the taper along the entire width of tooth 350A shown in FIG. 3. Note that four contoured teeth 350A-D are shown associated with the ramp 308, in FIG. 3. However, any number of teeth, three to seven may be associated with each ramp according to other embodiments of the present invention. In those other instances, the tooth having an outside taper would be left of cutoff tooth 350D in the view of FIG. 3. For example, see outside taper 556 in FIG. 5 and related discussion below.

Structural thickness, t, of ramps 308 may range from about 2 mm to about 5 mm according to embodiments of the present invention. Structural thickness, t, less than about 2 mm may not provide enough lifting surface along the ramp 308 for efficient up-shifting. Structural thickness, t, greater than about 5 mm may cause the bicycle chain to unnecessarily catch when the chain is tracking in smaller chain rings and angled in toward the larger chain ring because of rear cog alignment.

Referring to FIGS. 1 and 3, partially cutoff teeth 150D and 350D do not have a knife edge 334 because the upper portion of teeth 150D and 350D have been removed. The purpose for reducing the profile of teeth 150D and 350D by partially cutting off the upper portion of teeth 150D and 350D is to provide a point of lateral entry of the bicycle chain over the bicycle chain ring 100 and 300 during an up-shift. Thus, the partially cutoff teeth 150D and 350D encourage lateral movement of the bicycle chain from a small bicycle chain ring onto bicycle chain rings 100 and 300. This encouraging of lateral movement improves shifting performance over conventional bicycle chain rings such as the one illustrated in FIG. 2, where all of the teeth 250 are of identical height profile. Incidentally, the partially cutoff teeth 150D and 350D also improve down-shifting for essentially the same reason: encouraging lateral movement of the bicycle chain. However, during a down-shift, the bicycle chain is urged off of bicycle chain ring 300.

Embodiments of bicycle chain rings 100 and 300 illustrated in FIGS. 1 and 3 may have three contoured teeth 150B-D and 350B-D or four contoured teeth 150A-D and 350A-D associated with each ramp 108 and 308. However, other combinations and numbers of contoured teeth 150A-D and 350A-D may be associated with ramps 108 and 308 consistent with the present invention. Such other combinations and numbers of contoured teeth are considered to be within the spirit and scope of the present invention.

Figure 4:
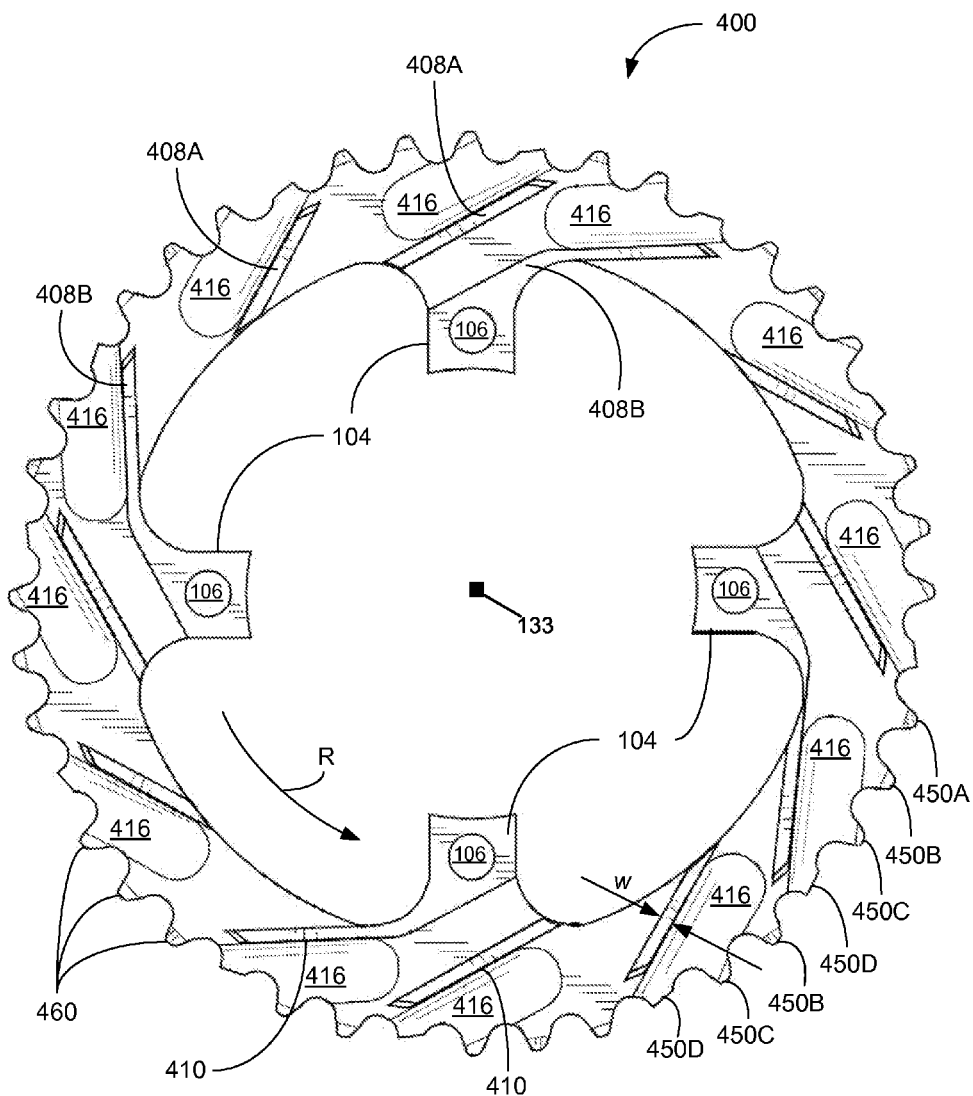
FIG. 4 is a plan view of the inside of another embodiment of a bicycle chain ring having 44 teeth configured for a standard 104 mm 4-bolt crankset according to the present invention.

FIG. 4 is a plan view of the inside of another embodiment of a bicycle chain ring 400 having 44 contoured teeth 450A-D configured for a standard 104 mm 4-bolt crankset according to the present invention. Bicycle chain ring 400 may be used as a large chain ring on a mountain bike crankset The axis of rotation 133 and the direction of rotation R are highlighted in FIG. 4. It will be readily apparent to one of ordinary skill in the art that the invention is not limited to any particular mounting bolt pattern, mounting bolt number, number of teeth or bolt pattern radius.

Contoured teeth 450A-D may include inside bevels 460 along the tips to achieve the angled knife edges (334 in FIG. 3) as a feature of the present invention. Inside bevels 460 form portions of the angled knife edges (334 in FIG. 3) that improve bicycle chain meshing as described herein. Inside bevels 460 may be of any shape that improves bicycle chain meshing and therefore, reduce noise and improves shifting performance relative to bicycle chain rings without such features.

According to the embodiment of bicycle chain ring 400, ramps 408 may be linear profile ramps 408A or bilinear profile ramps 408B. The bilinear profile ramps 408B may be partially formed on support structures 104, thus allowing for longer ramps and bilinear configurations. Ramps 408A-B may include gaps (not shown) according to other embodiments of bicycle chain ring 400, but each ramp 408A-B always supports more than a single link as distinguished from pins used in prior art chain rings. FIG. 4 also illustrates structural members 104 (four shown) and their associated mounting holes 106.

FIG. 4 also illustrates the regions of inside taper 416 adjacent the lifting surface 410 of each ramp 408A-B. Inside taper 416 may take any form or shape that narrows the thickness of the bicycle chain ring 400 above the ramps 408A-B according to various embodiments of the present invention. See also FIG. 6 and related discussion below for an enlarged view of inside taper 416. The structural width, w, of any given ramp 408A-B may be of any suitable dimension that provides consistent support of a bicycle chain. Any structural width, w, less than about 2 mm, may lack suitable wear characteristics for use on bicycles over extended periods of time. Structural width, w, may vary from among the ramps 408 located on a single bicycle chain ring 400 according to other embodiments of the present invention, e.g., see FIGS. 7 and 9, below. Structural width, w, may fall within the range from about 2 mm to about 30 mm according to various embodiments of the present invention.

Figure 5:
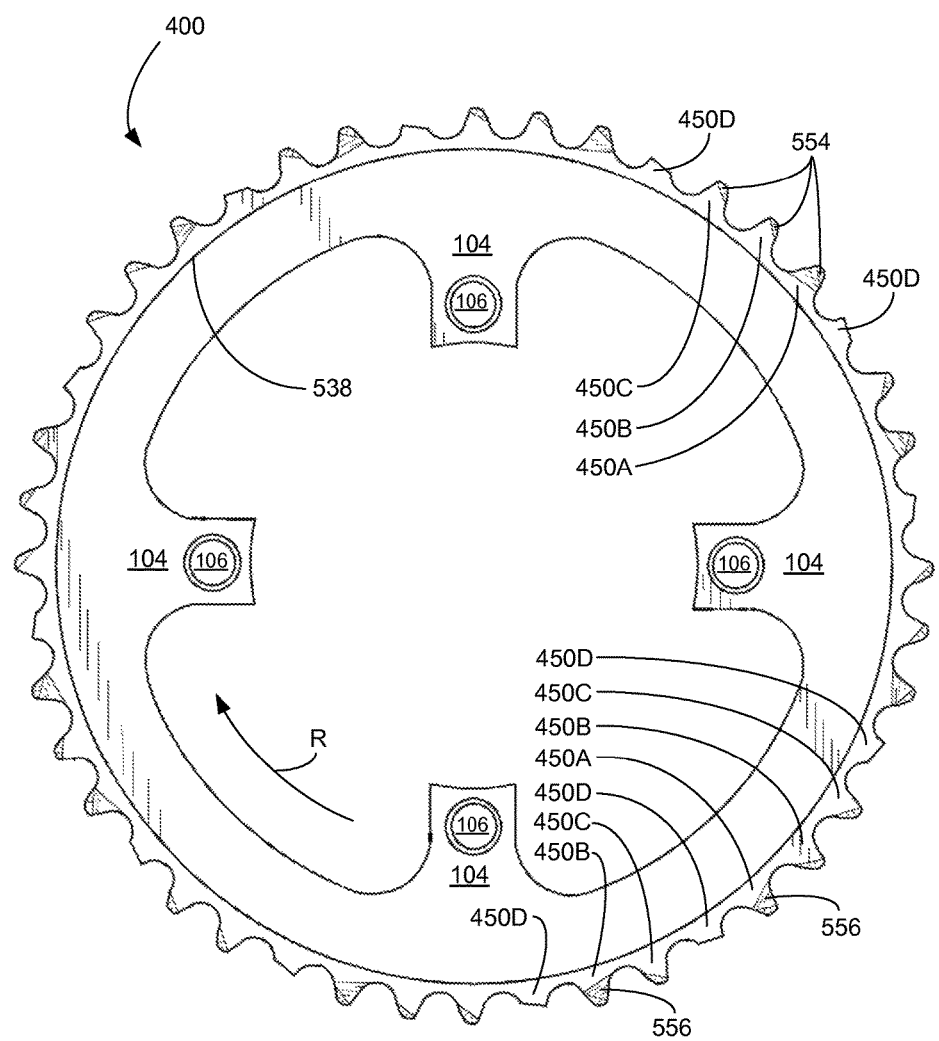
FIG. 5 is a plan view of the outside of the embodiment of the bicycle chain ring shown in FIG. 4.

FIG. 5 is a plan view of the outside of the embodiment of the bicycle chain ring 400 shown in FIG. 4. In the view of FIG. 5 outer ridge 538 appears as a circle underneath contoured teeth 450A-D. FIG. 5 also illustrates structural members 104 (four shown) and their associated mounting holes 106. FIG. 5 further illustrates the outside bevel 554 of contoured teeth 450, particularly contoured teeth 450A-C and not including partially cutoff teeth 450D (i.e., all teeth other than cutoff teeth 450D). Outside bevel 554 provides enhanced bicycle chain meshing as described above. Another feature of bicycle chain ring 400 illustrated in FIG. 5 is outside taper 556. Outside taper 556 is associated with contoured teeth 450A or 450B, depending on the number of contoured teeth (three or four) associated with a given ramp 408. Outside taper 556 narrows contoured teeth 450A or 450B at a position adjacent to cutoff teeth 450D. The outside taper 556 is configured to grab the inside of a bicycle chain link between cylindrical bushings. Thus, outside taper 556 can more quickly grab the bicycle chain (not shown) during an up-shift because the profile of contoured teeth 450A or 450B is narrower. Outside taper 556 may also improve chain meshing as described above. Embodiments of outside taper 556 may encompass most of the body of contoured teeth 450A or 450B as shown in bicycle chain ring 400 of FIG. 5. Alternatively, outside taper 556 may be a smaller chamfer, bevel or notch (not shown in FIG. 5, but see FIG. 8 and outside notch 856) on the body of contoured teeth 450A or 450B nearest contoured teeth 450D according to other embodiments of the present invention.

Figure 6:
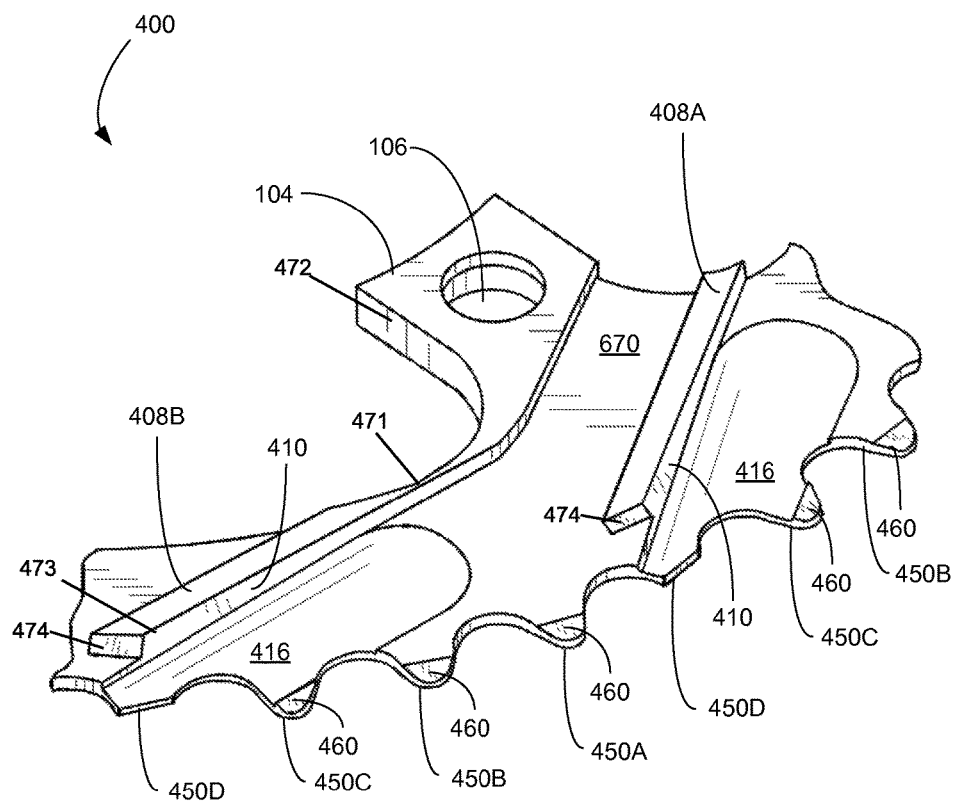
FIG. 6 is an enlarged perspective view of a portion of the inside of the bicycle chain ring shown in FIG. 4.

FIG. 6 is a perspective view of a portion of the inside of the bicycle chain ring 400 shown in FIG. 4, enlarged to show detail. The portion of the bicycle chain ring 400 shown in FIG. 6 includes two ramps 408, more specifically a linear profile ramp 408A and a bilinear profiled ramp 408B. FIG. 6 also highlights the FIG. 6 also illustrates a support structure 104, a mounting hole 106, a lifting surface 410 on each ramp 408A-B, contoured teeth 450A-D, inside bevels 460 associated with contoured teeth 450A-C and inside taper 416 adjacent ramps 408A-B. FIG. 6 further illustrates a channel 670 that is formed between adjacent ramps 408A-B on the inside surface of bicycle chain ring 400 according to the present invention. Channel 670 provides a space for the bicycle chain during up-shifts. The lifting surface 410 shown in FIG. 6 has a first width at a first point 471 located adjacent to the inner edge 472 or inner periphery. At a second point 473, the lifting surface has a second width that is greater than the first width. The first point 471 and second point 473 are located distant from each other and configured to simultaneously striking two distinct portions of a bicycle chain when the lifting surface first acts upon the chain. The ramps 408 also include disengagement surfaces 474 that are located near the teeth 460. The planar disengagement surfaces 474 are adjacent to and perpendicular to the inner surface of the chain ring as well as being adjacent to the lifting surfaces 410.

Figure 7:
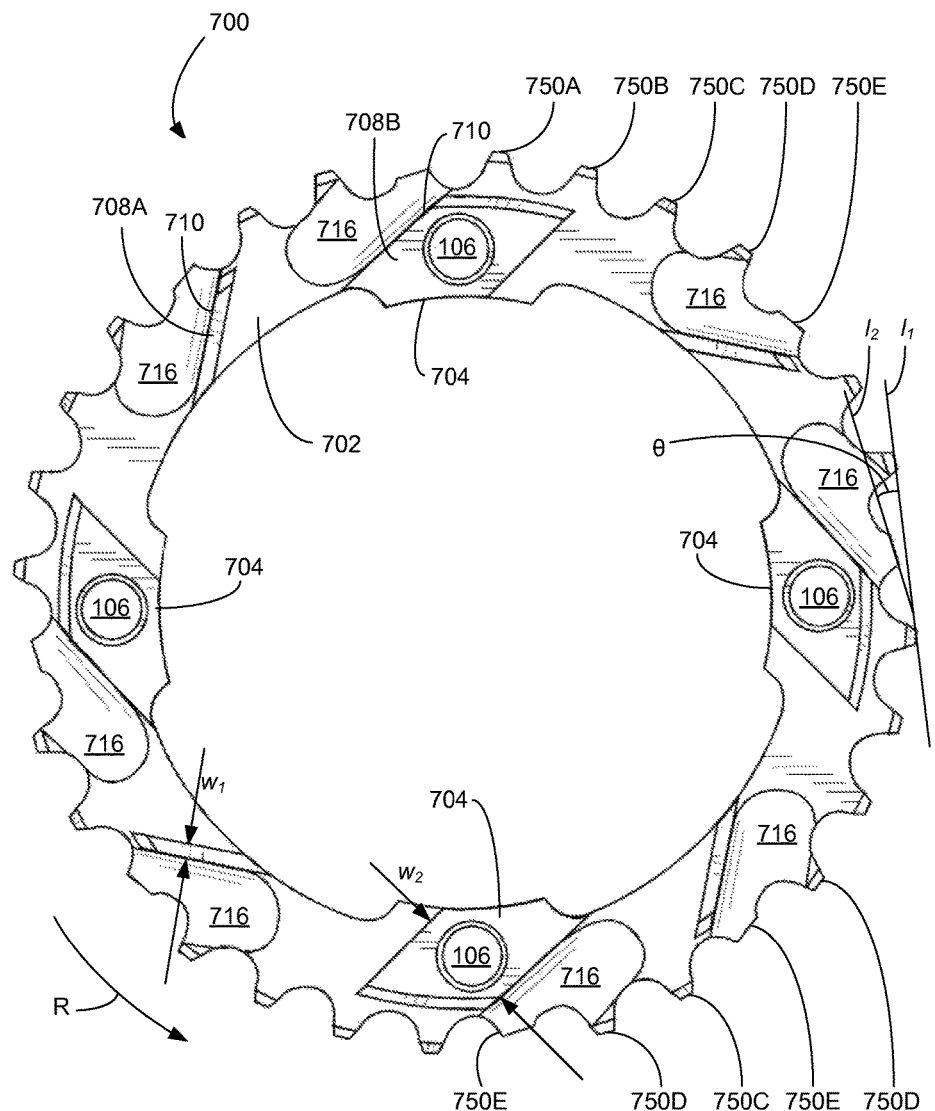
FIG. 7 is a plan view of the inside of yet another embodiment of a bicycle chain ring having 32 contoured teeth configured for a standard 104 mm 4-bolt crankset according to the present invention.

FIG. 7 is a plan view of the inside of yet another embodiment of a bicycle chain ring 700 having 32 contoured teeth 750A-D configured for a standard 104 mm 4-bolt crankset according to the present invention. Bicycle chain ring 700 may be configured as a middle chain ring on a mountain bike crankset Bicycle chain rings 400 and 700 together may form a compact set of chain rings for a mountain bike crankset Bicycle chain ring 700 may include a circular structural member 702, a plurality of support structures 704 (four shown), each with mounting holes 106 (four shown). Bicycle chain ring 700 may further include ramps 708A-B (eight total: four ramps 708A and four ramps 708B) of various widths, w, depending on the location of the ramp 708A-B. For example and not by way of limitation, ramp 708A may include relatively narrow width, $w_1$. Whereas ramp 708B may have a relatively wide width, $w_2$, that encompasses mounting hole 106, as shown in FIG. 7. As noted above, ramp structural width, w, $w_1$ or $w_2$, may be anywhere in the range from about 2 mm to about 30 mm. Structural thickness (not shown in FIG. 7) of ramps 708A-B may be as described above for the embodiment of bicycle chain ring 300 in FIG. 3.

Referring again to FIG. 7, each ramp 708A-B is configured with a lifting surface 710. Each ramp 708A-B may be associated with three or five contoured teeth 750A-E depending on the size and location of the associated ramp 708A-B. Partially cutoff teeth 750E are separated by non-partially cutoff, contoured teeth 750A-D. Of course, contoured teeth 750A-E shown in the embodiment of FIG. 7, may have similar features and characteristics to contoured teeth 150A-D, 350A-D and 450A-D, as other embodiments described above. Bicycle chain ring 700 may further have inside tapers 716 adjacent the lifting surfaces 710 of each ramp 708A-B. Inside tapers 716 may have similar features and characteristics to inside tapers 116 (FIGS. 1) and 316 (FIG. 3) described above. FIG. 7 also illustrates support structures 704 and associated mounting holes 106.

Figure 8:
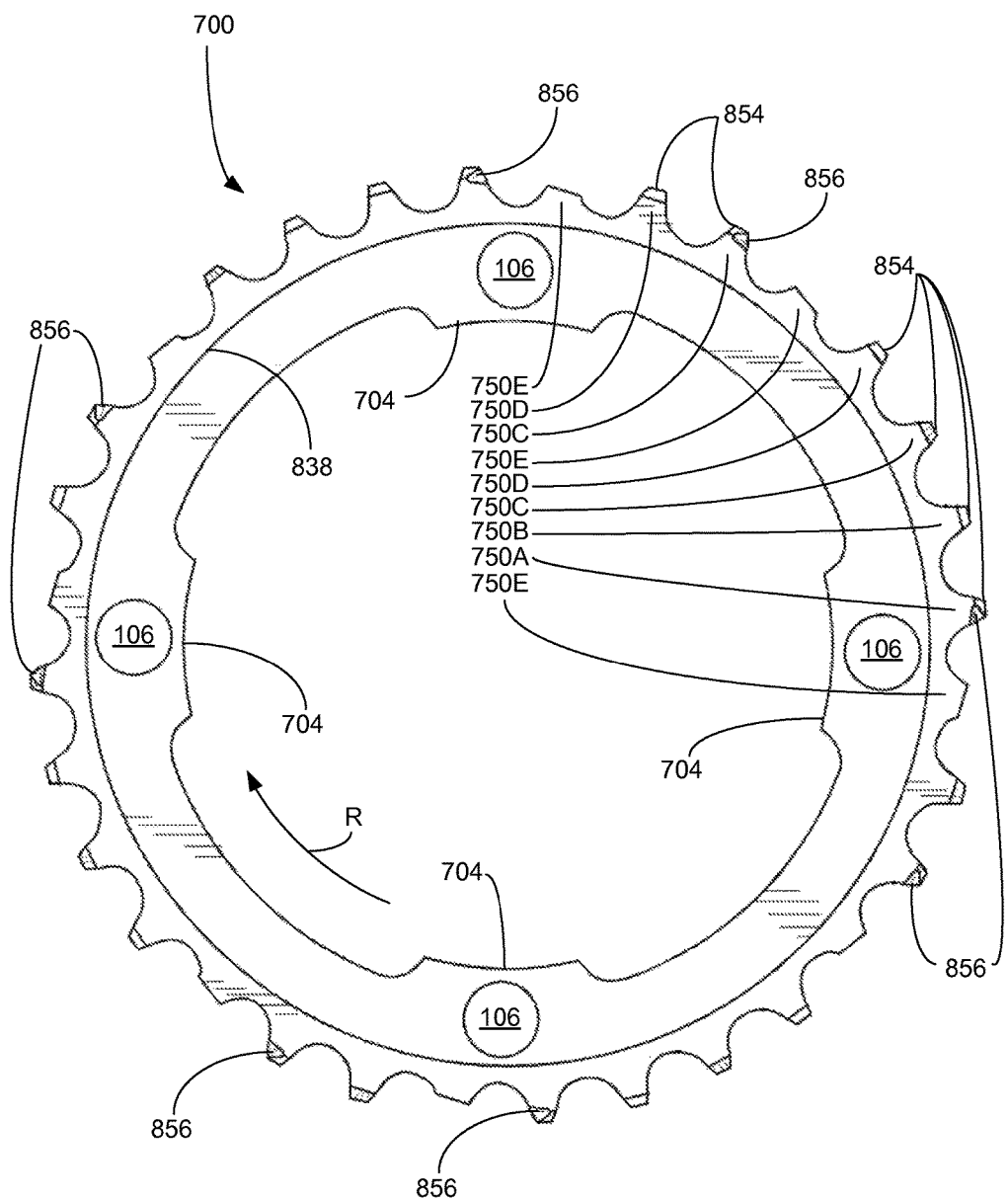
FIG. 8 is a plan view of the outside of the embodiment of the bicycle chain ring shown in FIG. 7.

FIG. 8 is a plan view of the outside of the embodiment of the bicycle chain ring 700 shown in FIG. 7. In the view of FIG. 8, outer ridge 838 appears as a circle underneath contoured teeth 750A-E. FIG. 8 also illustrates the outside bevel 854 of contoured teeth 750, particularly contoured teeth 750A-D and not including partially cutoff teeth 750E (i.e., all teeth other than cutoff teeth 750E). Outside bevel 854 provides enhanced bicycle chain meshing as described above. FIG. 8 also illustrates outside notch 856. Outside notch 856 is associated with contoured teeth 750A or 750C depending on the number of contoured teeth (three or five) associated with a given ramp 708 (not shown in FIG. 8). Outside notch 856 narrows contoured teeth 750A or 750C at a position adjacent to cutoff teeth 750E. The outside notch 856 is configured to grab the inside of a bicycle chain link between cylindrical bushings (not shown) in the chain (also not shown). Thus, outside notch 856 can more quickly engage the bicycle chain (not shown) during an up-shift, because the profile of contoured teeth 750A or 750C is narrower. Outside notch 856 may also improve chain meshing as described above. Other embodiments of outside notch 856 may encompass most of the body of contoured teeth 750A or 750C as shown in outside taper 556 of bicycle chain ring 400 of FIG. 5. FIG. 8 also illustrates support structures 704 and associated mounting holes 106.

Figure 9:
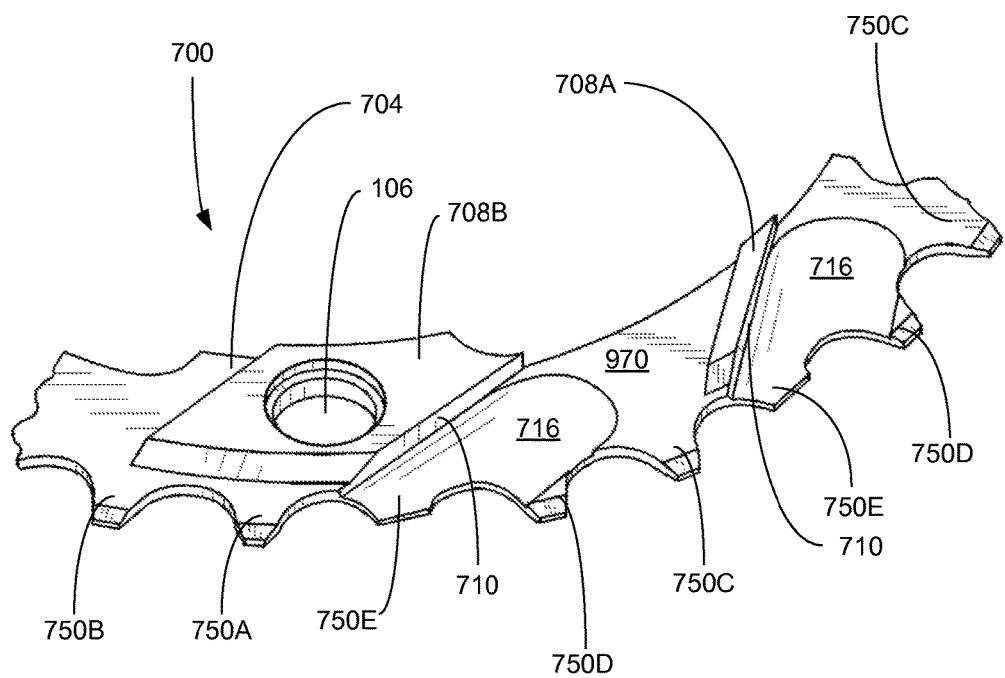
FIG. 9 is an enlarged perspective view of a portion of the inside of the bicycle chain ring shown in FIG. 7.

Referring now to FIG. 9, a perspective view of a portion of the inside of the bicycle chain ring 700 of FIG. 7 is enlarged to show detail. The portion of the bicycle chain ring 700 shown in FIG. 9 includes two linear ramps 708A-B, more specifically a narrow width ($w_1$) linear profile ramp 708A and a wide width ($w_2$) linear profiled ramp 708B (see also FIG. 7). FIG. 9 also illustrates a support structure 704, a mounting hole 106, a lifting surface 710 on each ramp 708A-B, contoured teeth 750A-E and inside taper 716 adjacent ramps 708A-B. FIG. 9 further illustrates a channel 970 that is formed between adjacent ramps 708A-B on the inside surface of bicycle chain ring 700 according to the present invention. Channel 970 provides a space for the bicycle chain during up-shifts.

Referring generally to FIGS. 1 and 3-7, embodiments of bicycle chain rings, 100, 300, 400 and 700 include between two and five nonpartially cutoff, contoured teeth 150A-C, 350A-C, 450A-C and 750A-D (see FIG. 11, below for an example of five nonpartially cutoff teeth) separating any two nearest cutoff teeth 150D, 350D, 450D and 750E. The centers of mounting holes 106 may be on the circumference of a circle 104 mm in diameter according to a particular embodiment of the bicycle chain rings of the present invention. According to alternative embodiments, centers of mounting holes 106 may be on the circumference of a circle 94 mm or 110 mm in diameter. The bicycle chain rings 100, 300, 400 and 700 disclosed herein may be configured for compatibility with any commercially available crankset, for example and not by way of limitation, cranksets manufactured by Shimano™, Campagnolo™, Race Face™, Truvative™, Richey™, Nashbar™, FSA™, and any other manufacturer or model of crankset Yet another feature of the partially cutoff teeth 150D, 350D, 450D and 750E disclosed herein is the angle, θ, at which the such teeth are cutoff. Referring specifically to FIG. 7, note that angle, θ, is shown as measured from tangential line, $l_1$, to angled line, $l_2$, traced through the top of partially cutoff teeth 750E. By partially cutting off teeth 750E at angle, θ, the bicycle chain is given clearance it needs during a down-shift to be able to move laterally past the partially cutoff tooth 750E and drop off chain ring 700 to engage the next smaller chain ring (not shown). During a down-shift, the partially cutoff tooth 750E allows an entire chain link to move laterally towards the inside of bicycle chain ring 700 and past the partially cutoff tooth 750E without making contact with tooth 750E. This feature promotes faster down-shifts. The angled (θ) cutoff teeth 750E are preferred to tangentially cutoff teeth of the prior art (see e.g., U.S. Pat. No. 5,078,653 to Nagano as discussed above in the background) because the bicycle chain comes off of chain ring 700 at an angle approximated by angle, θ, not tangentially, during a down-shift.

Figure 10:
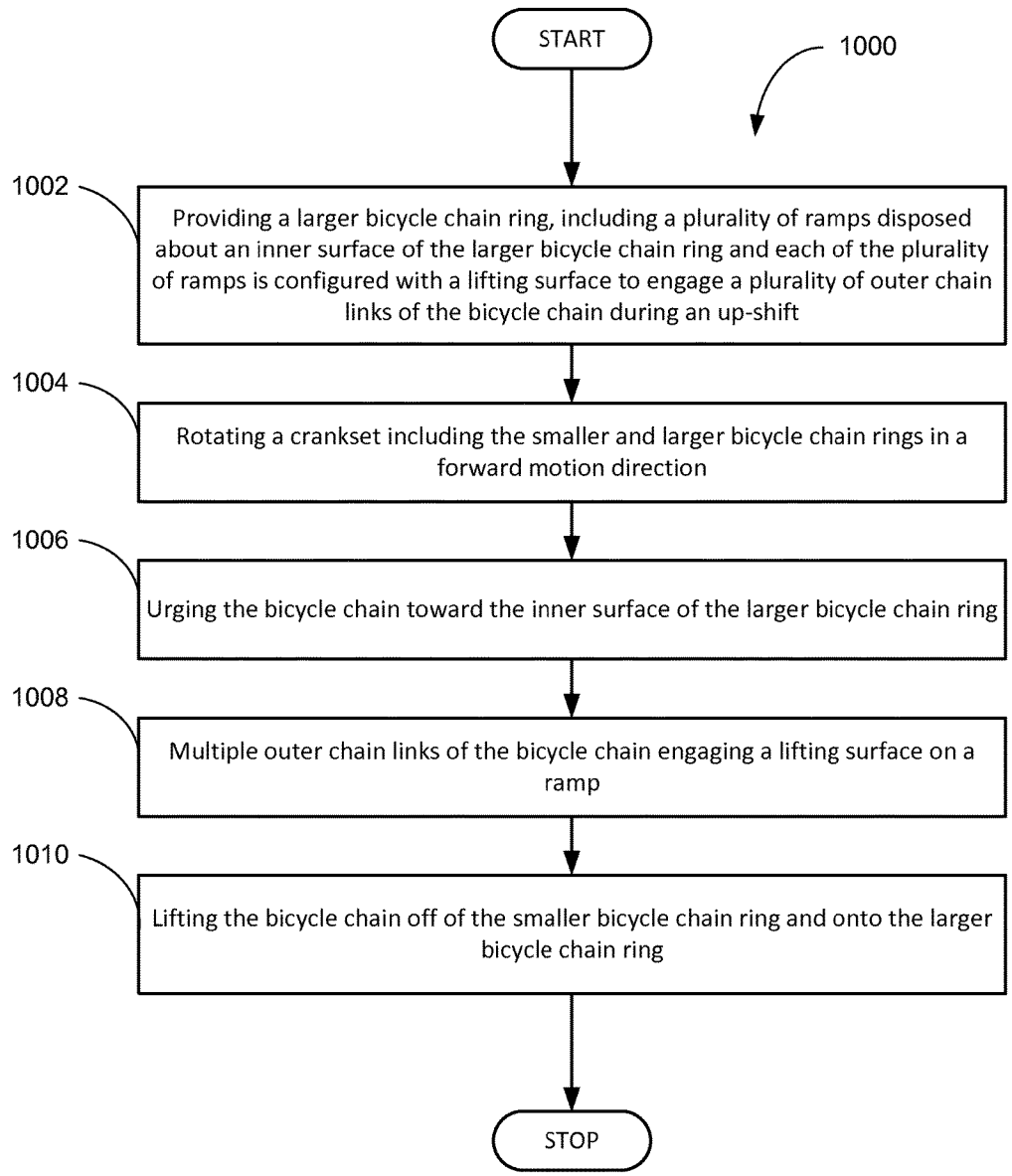
FIG. 10 is a flow chart of an embodiment of a method for up-shifting a bicycle chain from a smaller bicycle chain ring to a larger bicycle chain ring.

FIG. 10 is a flow chart of an embodiment of a method 1000 for up-shifting a bicycle chain from a smaller bicycle chain ring to a larger bicycle chain ring. Method 1000 may include providing 1002 a larger bicycle chain ring as described herein. Method 1000 may further include rotating 1004 a crankset including the smaller and larger bicycle chain rings in a forward motion direction. Method 1000 may further include urging 1006 the bicycle chain toward the inner surface or side of the larger bicycle chain ring. This urging 1006 may be achieved by activating a front derailleur having a chain guide that pushes laterally against the sides of a bicycle chain. Alternatively, urging 1006 may be achieved by activating a front derailleur such as those described in U.S. Pat. No. 6,454,671 and U.S. Published Patent Application No. US20020177498, both to the present inventor, Christopher A. Wickliffe, thereby lifting a lower outside corner of a bicycle chain toward the larger chain ring. Method 1000 may further include multiple outer chain links of the bicycle chain engaging 1008 a lifting surface on a ramp and lifting 1010 the bicycle chain off of the smaller bicycle chain ring and onto the larger bicycle chain ring.

Additional embodiments of bicycle chain rings according to the present invention are shown in FIGS. 11-29. FIG. 11 is a plan view of the inside of a 32 tooth bicycle chain ring 1100 on 94 mm mounting bolt centers having five mounting bolt holes according to an embodiment of the present invention. FIG. 12 is an enlarged perspective view of a portion of the inside of the bicycle chain ring 1100 shown in FIG. 11. FIG. 12 provides an enlarged illustration of mounting hole 106, ramps 1108A and 1108B, and inside taper 1116 associated with this embodiment of a bicycle chain ring 1100. The ramp 1108A includes a lifting surface with a concave portion 1117 adjacent to the inner edge FIG. 13 is a super-enlarged perspective view of a portion of the inside of the bicycle chain ring 1100 shown in FIG. 11-12. FIG. 13 illustrates inside taper 1116, mounting hole 106 and ramp 1108A. FIG. 13 also illustrates a seamless transition 1123 between the inner side of the ring and the inwardly extending surface. The inwardly extending surface includes a portion that is flush with the edge. The concave portion highlighted in FIG. 12 includes a portion that is flush with the inner edge (see also FIG. 11).

Figure 14:
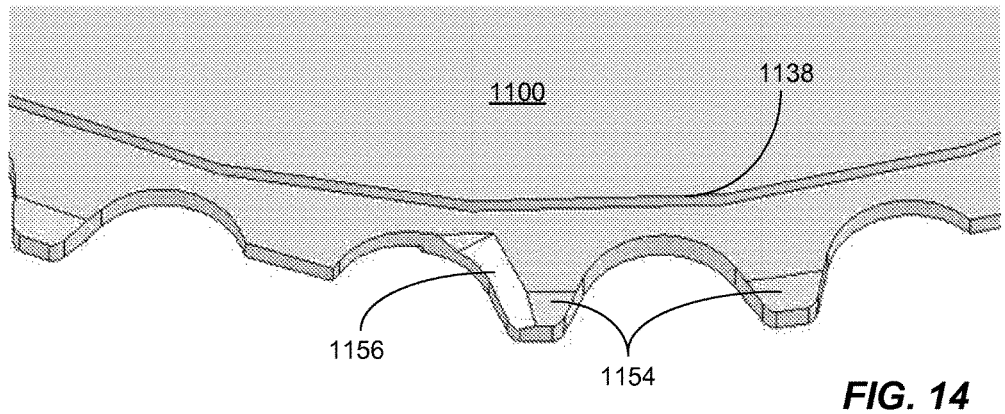
FIGS. 14-15 are enlarged perspective views of the outside of the bicycle chain ring shown in FIG. 11-13.
Figure 15:
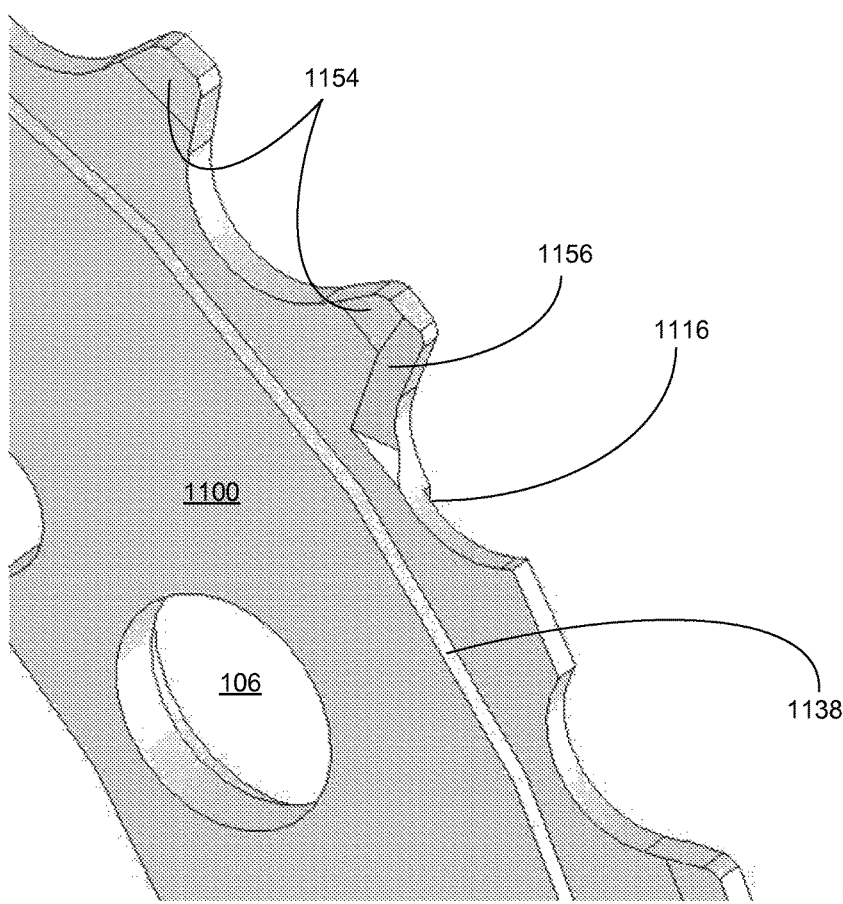

FIGS. 14-15 are enlarged perspective views of the outside of the bicycle chain ring 1100 shown in FIG. 11-13. FIGS. 14-15 shows an enlarged perspective view of outer ridge 1138, outside bevels 1154 and outside notch 1156. FIG. 15 also shows mounting hole 106 and an obstructed view of inside taper 1116.

It is important to note that the ramps 108, 308, 408A-B, 708A-B and 1108A-B, on the inside surface of the bicycle chain rings 100, 300, 400, 700 and 1100 disclosed herein, contact and lift the bicycle chain directly underneath the load points, i.e., chain link rollers (bushings and pins), of multiple chain links during an up-shift. Each ramp engages the bicycle chain directly below the chain link rollers and lifts at multiple load points (below each chain link roller). This is in distinct contrast to conventional bicycle chain rings with pins that attempt to accomplish the same task. Such conventional pin lifting is necessarily at a single load point (between two chain link rollers) to accomplish the bicycle chain lifting. Thus, the ramps 108, 308, 408A-B, 708A-B and 1108A-B, of the present invention spread the load over multiple load points.

Figure 16:
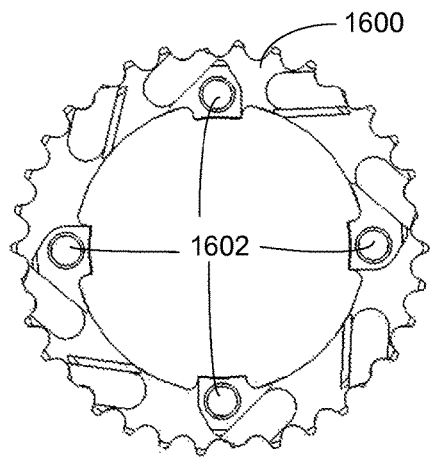
FIG. 16 is a plan view of an embodiment of a 34 tooth bicycle chain ring on 104 mm mounting bolt centers having four mounting holes according to an embodiment of the present invention.
Figure 17:
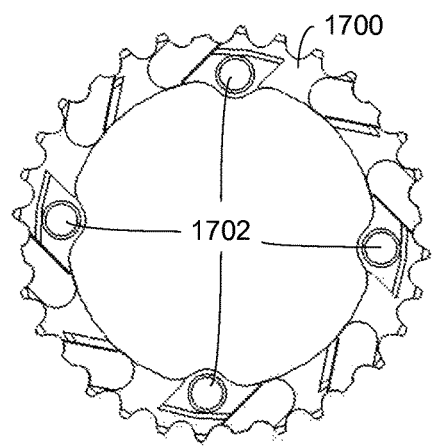
FIG. 17 is a plan view of an embodiment of a 32 tooth bicycle chain ring compatible with a four mounting hole Shimano™ XTR™ crankset according to an embodiment of the present invention.
Figure 18:
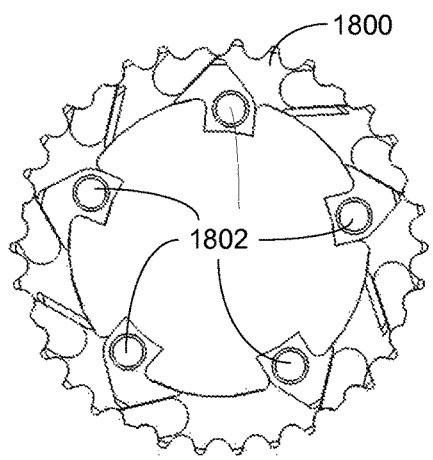
FIG. 18 is a plan view of an embodiment of a 34 tooth bicycle chain ring on 94 mm mounting bolt centers having five mounting holes according to an embodiment of the present invention.
Figure 19:
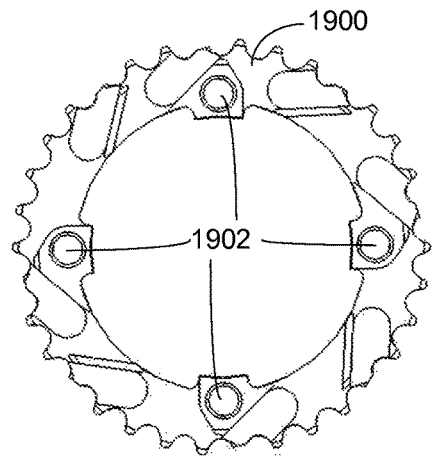
FIG. 19 is a plan view of an embodiment of a 34 tooth bicycle chain ring on 104 mm mounting bolt centers having four mounting holes according to an embodiment of the present invention.
Figure 20:
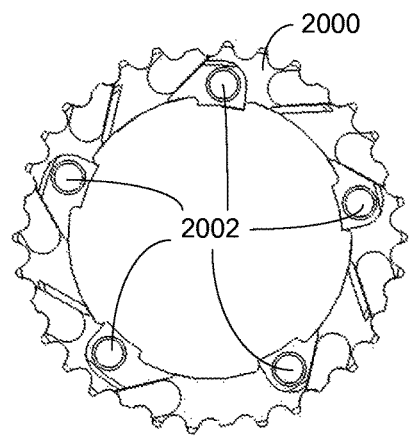
FIG. 20 is a plan view of an embodiment of a 34 tooth bicycle chain ring on 110 mm mounting bolt centers having five mounting holes according to an embodiment of the present invention.
Figure 21:
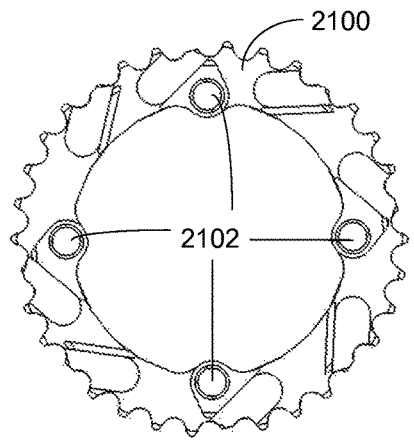
FIG. 21 is a plan view of an embodiment of a 34 tooth bicycle chain ring compatible with a four mounting hole Shimano™ XTR™ crankset according to an embodiment of the present invention.
Figure 22:
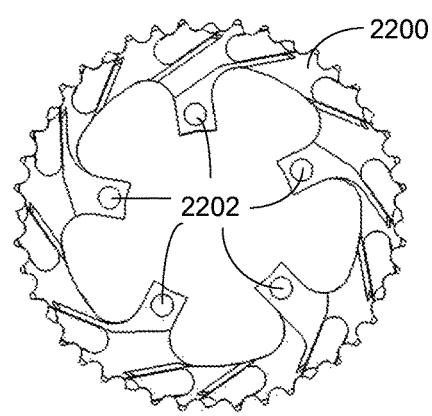
FIG. 22 is a plan view of an embodiment of a 44 tooth bicycle chain ring on 94 mm mounting bolt centers having five mounting holes according to an embodiment of the present invention.
Figure 23:
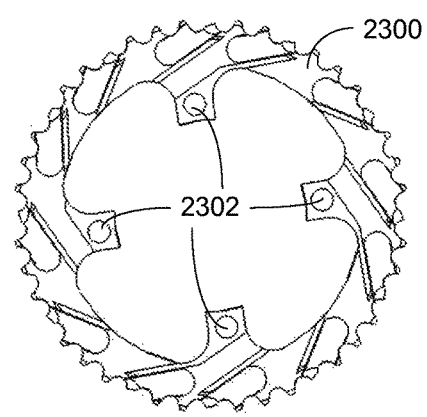
FIG. 23 is a plan view of an embodiment of a 44 tooth bicycle chain ring on 104 mm mounting bolt centers having four mounting holes according to an embodiment of the present invention.
Figure 24:
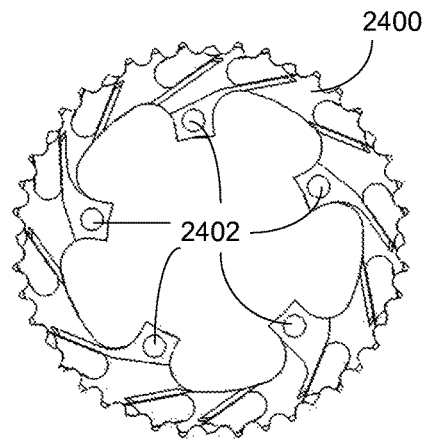
FIG. 24 is a plan view of an embodiment of a 44 tooth bicycle chain ring on 110 mm mounting bolt centers having five mounting holes according to an embodiment of the present invention.
Figure 25:
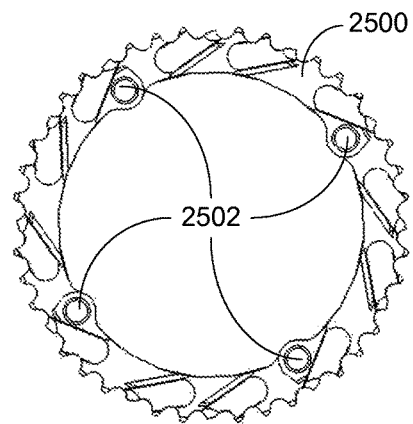
FIG. 25 is a plan view of an embodiment of a 44 tooth bicycle chain ring compatible with a four mounting hole Shimano™ XTR™ crankset according to an embodiment of the present invention.
Figure 26:
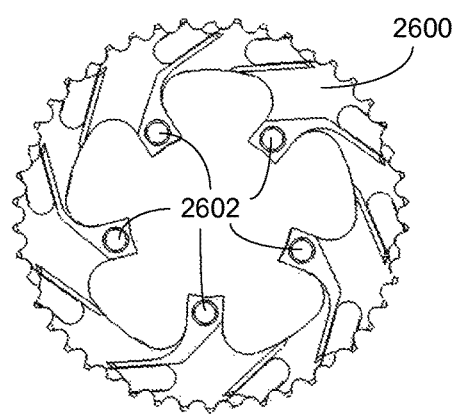
FIG. 26 is a plan view of an embodiment of a 46 tooth bicycle chain ring on 94 mm mounting bolt centers having five mounting holes according to an embodiment of the present invention.
Figure 27:
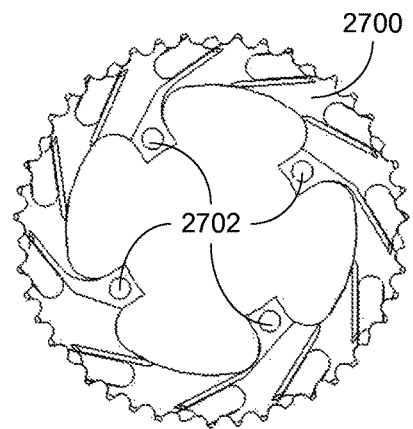
FIG. 27 is a plan view of an embodiment of a 46 tooth bicycle chain ring on 104 mm mounting bolt centers having four mounting holes according to an embodiment of the present invention.
Figure 28:
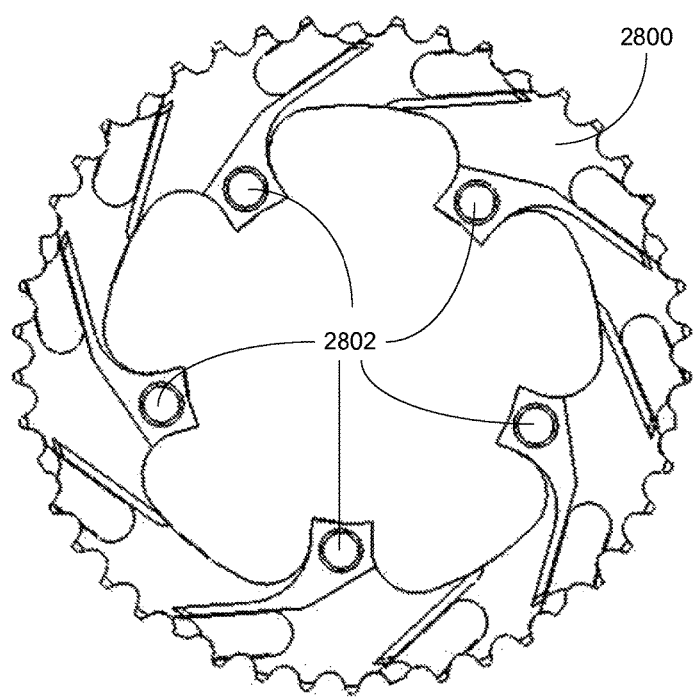
FIG. 28 is a plan view of an embodiment of a 46 tooth bicycle chain ring on 110 mm mounting bolt centers having five mounting holes according to an embodiment of the present invention.
Figure 29:
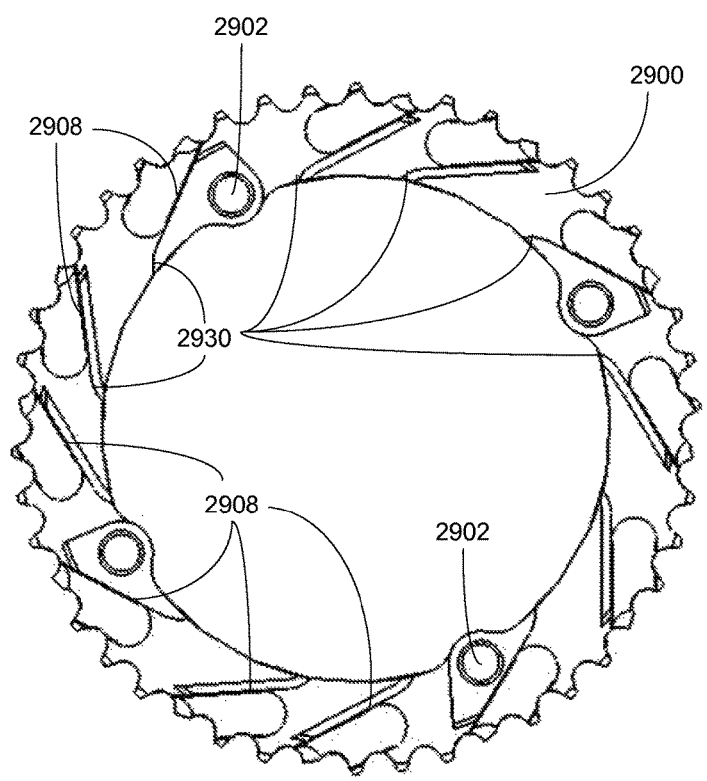
FIG. 29 is a plan view of an embodiment of a 46 tooth bicycle chain ring compatible with a four mounting hole Shimano™ XTR™ crankset according to an embodiment of the present invention.

FIG. 16 is a plan view of an embodiment of a 34-tooth bicycle chain ring on 104 mm mounting bolt centers 1600 having four mounting holes 1602 according to an embodiment of the present invention. FIG. 17 is a plan view of an embodiment of a 32-tooth bicycle chain ring 1700 compatible with a four mounting hole-Shimano™ XTR™ crankset (not shown) according to an embodiment of the present invention. Chain ring 1700 includes 4 mounting holes 1702. FIG. 18 is a plan view of an embodiment of a 34-tooth bicycle chain ring on 94 mm mounting bolt centers 1800 having five mounting holes 1802 according to an embodiment of the present invention. FIG. 19 is a plan view of an embodiment of a 34-tooth bicycle chain ring on 104 mm mounting bolt centers 1900 having four mounting holes 1902 according to an embodiment of the present invention. FIG. 20 is a plan view of an embodiment of a 34-tooth bicycle chain ring on 110 mm mounting bolt centers 2000 having five mounting holes 2002 according to an embodiment of the present invention. FIG. 21 is a plan view of an embodiment of a 34-tooth bicycle chain ring 2100 compatible with a four mounting hole Shimano™ XTR™ crankset (not shown) according to an embodiment of the present invention. Chain ring 2100 includes four mounting holes 2102. FIG. 22 is a plan view of an embodiment of a 44-tooth bicycle chain ring on 94 mm mounting bolt centers 2200 having five mounting holes 2202 according to an embodiment of the present invention. FIG. 23 is a plan view of an embodiment of a 44-tooth bicycle chain ring on 104 mm mounting bolt centers 2300 having four mounting holes 2302 according to an embodiment of the present invention. FIG. 24 is a plan view of an embodiment of a 44-tooth bicycle chain ring on 110 mm mounting bolt centers 2400 having five mounting holes 2402 according to an embodiment of the present invention. FIG. 25 is a plan view of an embodiment of a 44-tooth bicycle chain ring 2500 compatible with a four mounting hole Shimano™ XTR™ crankset (not shown) according to an embodiment of the present invention. Chain ring 2500 includes four mounting holes 2502. FIG. 26 is a plan view of an embodiment of a 46-tooth bicycle chain ring on 94 mm mounting bolt centers 2600 having five mounting holes 2602 according to an embodiment of the present invention. FIG. 27 is a plan view of an embodiment of a 46-tooth bicycle chain ring on 104 mm mounting bolt centers 2700 having four mounting holes 2702 according to an embodiment of the present invention. FIG. 28 is a plan view of an embodiment of a 46-tooth bicycle chain ring on 110 mm mounting bolt centers 2800 having five mounting holes 2802 according to an embodiment of the present invention. FIG. 29 is a plan view of an embodiment of a 46-tooth bicycle chain ring 2900 compatible with a four mounting hole Shimano™ XTR™ crankset (not shown) according to an embodiment of the present invention. Chain ring 2900 includes four mounting holes 2902. Chain ring 2900 further includes twelve ramps 2908 having a leading edge 2930 that is curved in profile. Thus, ramps 2908 have both a linear profile and a curved profile on the leading edge 2930.

While the foregoing advantages of the present invention are manifested in the illustrated embodiments of the invention, a variety of changes can be made to the configuration, design and construction of the invention to achieve those advantages. Hence, reference herein to specific details of the structure and function of the present invention is by way of example only and not by way of limitation.

I claim:

1. A bicycle chain ring, comprising
an inner periphery forming an inner opening disposed in a surrounding configuration to an axis of rotation;
an outer periphery of the chain ring where a plurality of chain ring teeth emanate;
an inner surface extending between the inner periphery and the outer periphery;
a plurality of ramps disposed about the inner surface, wherein each of the plurality of ramps includes a lifting surface for initiating lift of a bicycle chain without assistance from the plurality of chain ring teeth, the lifting surface initiating lift of the bicycle chain by simultaneously engaging the bicycle chain at two or more distinct points during an up-shift;
at least one of the lifting surfaces extending radially along the inner surface from the inner periphery of the chain ring outward toward the outer periphery.

2. The bicycle chain ring according to claim 1, wherein at least one of the lifting surfaces is curved in profile.

3. The bicycle chain ring according to claim 1, wherein each of the plurality of ramps ends at a trough between two teeth, wherein one of the two teeth is partially cutoff.

4. The bicycle chain ring according to claim 1, further comprising an inside taper gradually narrowing thickness of the bicycle chain ring, the inside taper located adjacent to each of the plurality of ramps.

5. The bicycle chain ring according to claim 4, wherein the inside taper provides decreasing bicycle chain ring thickness in a direction opposite normal rotation of the bicycle chain ring during an up-shift.

6. The bicycle chain ring according to claim 1, further comprising partially cutoff teeth located radially outward from an outer end of each of the plurality of ramps.

7. The bicycle chain ring according to claim 6, further comprising a plurality of non-partially cutoff teeth in between each of the partially cutoff teeth, each non-partially cutoff tooth having an inside bevel located proximate its tip.

8. A bicycle chain ring, comprising
an inner periphery forming an inner opening disposed in a surrounding configuration to an axis of rotation,
a plurality of ramps disposed about an inner surface of the bicycle chain ring,
wherein each of the plurality of ramps is configured with a lifting surface protruding from the inner surface toward a smaller adjacent chain ring, and extending from a first radial position representing the inner periphery of the bicycle chain ring, outward to a radius measured from an axis of rotation out toward, but stopping short of, bottoms of troughs between chain ring teeth, the lifting surface having placement and length sufficient to engage and to lift the bicycle chain at two or more chain load points during an up-shift, the load points being directly under chain pivot axes.

* * * * *

UNITED STATES PATENT AND TRADEMARK OFFICE
CERTIFICATE OF CORRECTION

PATENT NO. : 9,677,658 B2  Page 1 of 1
APPLICATION NO. : 14/144329
DATED : June 13, 2017
INVENTOR(S) : Christopher A. Wickliffe It is certified that error appears in the above-identified patent and that said Letters Patent is hereby corrected as shown below:

On the Title Page

Item (63) entitled "Related U.S. Application Data", please change the term "Continuation" to "Continuation-in-part"

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*